Feb. 8, 1938.                F. HYMANS                    2,107,894
                           BRAKE MECHANISM
                         Filed Aug. 14, 1936
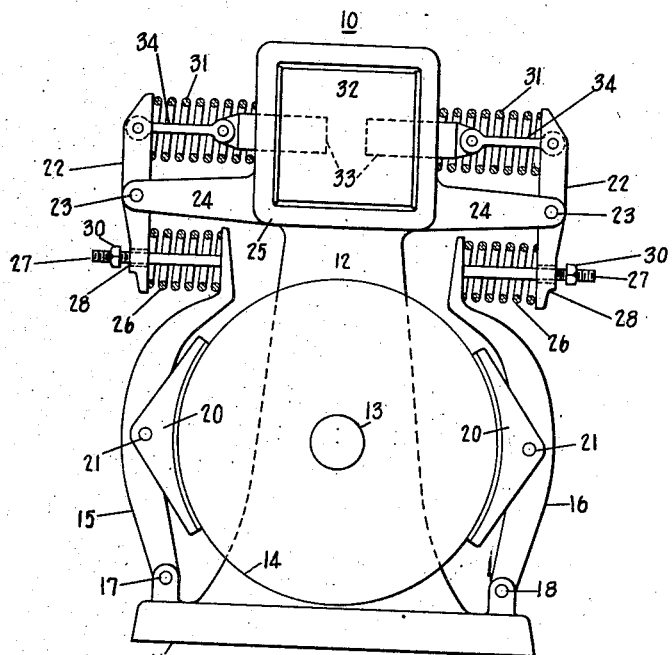
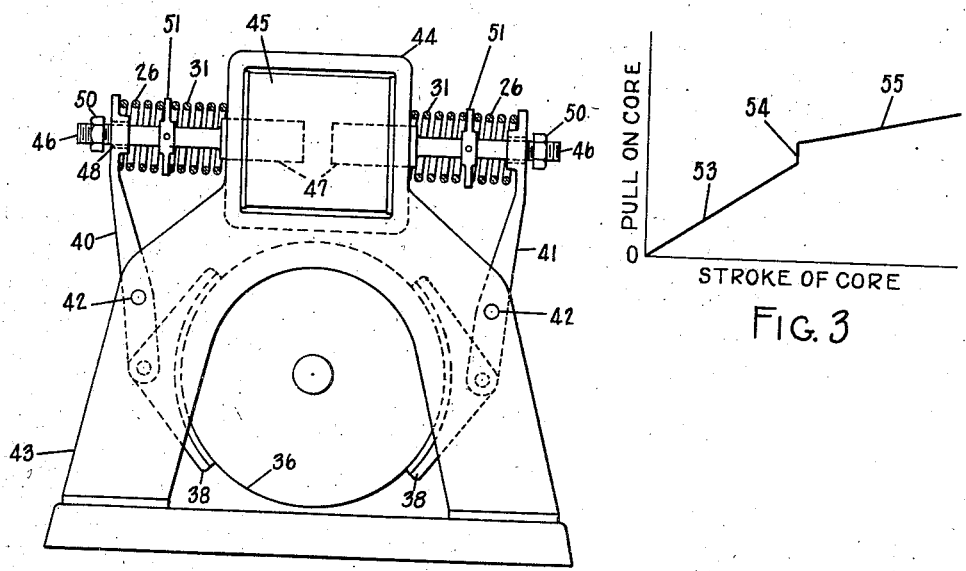
Frederick Hymans INVENTOR
BY Walter E. Bradley ATTORNEY Patented Feb. 8, 1938

2,107,894

UNITED STATES PATENT OFFICE 2,107,894

BRAKE MECHANISM

Frederick Hymans, Larchmont, N. Y., assignor to Otis Elevator Company, New York, N. Y., a corporation of New Jersey Application August 14, 1936, Serial No. 95,949

2 Claims. (Cl. 188—171)

The invention relates to brakes and especially to brakes for elevators.

Brakes for elevator hoisting motors, according to general practice, are usually of the form in which a pair of oppositely disposed brake shoes are applied to a brake drum by mechanical means and released electromagnetically. Such brakes are termed electromechanical brakes. The invention is especially applicable to brakes of this character and, although the invention is applicable to other brake constructions, the principles of the invention will be described as applied to electromechanical brakes.

It is desirable in the control of an elevator car that the car be brought to rest smoothly and without discomfort to its occupants when the electromechanical brake is applied. It is also desirable, especially in cases where the car is under the control of an attendant, that the brake be controlled in such way that an accurate gauge of distance may be made. This is of particular importance in the case of inching the car to a desired stopping point.

The invention involves delaying the action of the brake when it is applied and also when it is released.

One feature of the invention is to gradually decrease the pressure of the brake before it is actually released.

Another feature of the invention is to gradually build up the pressure of the brake when it is applied.

In carrying out the invention, as applied to an electromechanical brake, resilient means is interposed between the applying and releasing means and each brake shoe. The force with which the brake shoe is applied is exerted by the resilient means which, in turn, is the force exerted on the resilient means by the brake applying means. When the brake releasing means acts to release the brake shoes, the force exerted by each resilient means is gradually decreased before the brake shoe is disengaged from the drum. When the brake applying means acts to apply the brake shoes, the shoes are brought into immediate engagement with the drum but thereafter the brake applying means acts through the resilient means, which delays the building up of the brake applying force to full value.

In a construction in which the brake shoes are applied by compression springs and electromagnetically released, auxiliary springs, preferably compression springs, are interposed between the brake shoes and the operating means. The applying springs act through the auxiliary springs to apply the shoes to the brake drum. When the electromagnet is energized to effect the release of the shoes, the auxiliary springs expand, gradually decreasing the pressure with which the shoes are applied. Before the auxiliary springs fully expand, the brake shoes are picked up and disengaged from the drum. When the electromagnet is deenergized, the applying springs expand to cause the shoes immediately to engage the drum. Thereafter the applying springs act through the auxiliary springs, compressing these springs and thus gradually building up the pressure which the shoes exert on the drum.

A general idea of the invention, the mode of carrying it out which is at present preferred, and various features and advantages thereof can be gained from the above statements. Other features and advantages of the invention will be apparent from the following description and appended claims.

In the drawing:

Figure 1 is a schematic view in side elevation of electromechanical braking mechanism embodying the invention;

Figure 2 is a schematic view in side elevation of another form of electromechanical braking mechanism embodying the invention.

Figure 3 is a pull curve employed to illustrate the principles of operation of the invention.

Referring to Figure 1, the brake 10 therein illustrated is provided with a base 11 having a pedestal 12 in which is journalled a shaft 13 for supporting brake pulley 14. Brake arms 15 and 16 are pivotally suported on base 11 by means of pins 17 and 18. Opposed brake shoes 20 are pivotally connected at 21 to arms 15 and 16 in position to engage the brake drum. The brake shoes are spring applied and electromagnetically released. A releasing electromagnet 32 is mounted in a frame 25 on the top of pedestal 12. The electromagnet has a pair of oppositely disposed movable cores 33. These cores are attracted to effect the release of the brake shoes when the electromagnet is energized. As the arrangement is the same for each brake arm, that for only one of them, arm 15, will be described.

The application and release of the shoe is effected through the intermediary of a rocker lever 22. This lever is pivotally mounted at 23 on a lug 24 which extends outwardly from one side of frame 25. A spiral compression spring 26 is mounted between the upper end of brake arm 16 and the lower end of the rocker lever. A rod 27, secured at one end to the brake arm, extends centrally through the spring. This rod also extends with ample clearance through aperture 28 provided in the rocker lever and is provided on its outer end with an adjustable stop 30. The upper end of the rocker lever is connected by a link 34 with a core 33 of the electromagnet. A spiral compression spring 31 is arranged between the upper end of the lever and the magnet frame, the link and core extending centrally through this spring.

When the electromagnet is deenergized, the parts of the brake mechanism assume the position illustrated. The springs 31 are expanded, acting through rocker levers 22, springs 26 and the brake arms to apply the brake shoes to the drum. The force exerted on the upper end of each brake arm to apply the brake shoe to the drum is the force exerted by spring 26 which is maintained in a state of compression by spring 31 acting through the rocker lever. Stop 30 is set so that a certain clearance exists between it and the rocker lever with the brake shoe fully applied. Clearance is provided between the ends of the cores to permit full release of the brake shoes from the drum.

To release the brake, the electromagnet is energized. This pulls the cores 33 inwardly. Each core, upon being attracted, acts through link 34 to pull its rocker lever 22 about pivot 23 against the force of spring 31. The brake shoe is not released during the first part of this movement, owing to the clearance between stop 30 and the lower end of the rocker lever. This clearance permits spring 26 to expand, as movement of the lever takes place, and thus to act on the brake arm to hold the shoe in engagement with the drum with a constantly decreasing pressure. As this clearance is taken up, the brake arm is picked up to release the brake shoe from the drum. After the shoes are fully released from the drum, the mechanism is brought to a stop as by the meeting of the cores, or in other suitable ways, when core abutment is not considered desirable.

To apply the brake, the electromagnet is deenergized. This permits springs 31 to expand. Each spring in expanding acts through its rocker lever 22 and spring 26 to move the brake arm in a direction to apply the brake shoe to the drum. After the shoe engages the drum, further expansion of spring 31 causes the compression of spring 26, thereby gradually increasing the force with which the brake shoe is applied. When spring 26 has been compressed to a point where it exerts a force against the rocker lever which is equal and opposite to the force exerted thereon by spring 31, a state of equilibrium is reached and the maximum force is exerted applying the shoe to the drum.

It is to be understood that the principles of the invention are applicable to many different forms of brake construction, the construction schematically shown in Figure 1 being chosen merely for purposes of illustration. Another application of these principles is illustrated, by way of example, in Figure 2. In the construction illustrated in this figure, the brake arms 40 and 41 are respectively pivoted at 42 on the brake stand 43. The brake shoes 38 are pivotally supported by the lower ends of the brake arms for application to the brake drum 36. The releasing electromagnet 45 is mounted in frame 44 on the top of the brake stand. Each of the movable cores 47 of the electromagnet has an elongated stem 46. Compression springs 26 and 31 are arranged on these stems. The arrangement is the same for each brake arm. The stem extends through an aperture 48 in the upper end of the brake arm, ample clearance being provided to permit free movement of the brake arm. The outer end of the stem is provided with an adjustable stop 50. A collar 51 is secured on the stem between frame 44 and the brake arm. Spring 31 is positioned between the magnet frame and the collar while spring 26 is arranged between the collar and the end of the brake arm.

The operation of the brake mechanism of Figure 2 is similar to that of the mechanism of Figure 1. The parts of the mechanism are illustrated in the position they assume with the brake fully applied. Upon energization of the electromagnet to release the brake, each core is pulled inwardly, compressing spring 31 and decreasing the clearance between the brake arm and its stop. As this takes place, the pressure with which the shoe is applied to the drum gradually diminishes. Upon the clearance being taken up, the brake arm is moved to release the shoe from the drum. When the electromagnet is deenergized, springs 31 expand to apply the shoes to the drum. After this engagement takes place, each of springs 31 continues to expand, compressing spring 26 until it exerts a force equal to that exerted by spring 31. No further movement takes place after this condition is reached, as a state of equilibrium exists.

Thus it is seen that with brake mechanism embodying the principles of the invention, the brake shoes are gradually released and applied. This gives a delayed action for both operations. Such action is desirable, especially in certain elevator installations. The delayed action upon release of the brake is desirable for inching operations, that is, operations in which the elevator car is moved a short distance at a time in order to reach a desired point in the hatchway. For such short movements of the car, the brake shoes do not leave the brake drum during the short time that the electromagnet is energized, thereby permitting the brake to be more quickly applied and thus the amount of car movement to be more accurately gauged. The delayed action upon applying the brake is desirable to facilitate the making of smooth stops. The gradual building up of the brake applying force after the shoe has engaged the drum causes the car to be brought to rest smoothly and without shock to the occupants of the car. Brake mechanism embodying the invention is particularly adapted for alternating current power supply as it permits the use of a long stroke magnet operating on low excitation with an air gap between cores when the brake shoes are fully released, thus minimizing noise. If desired, the application or release of the brake or both actions may be further delayed, as by an adjustable dash pot arrangement connected, for example in Figure 1, to rocker levers 22.

The action of a brake embodying the principles of applicant's invention has been graphically illustrated in Figure 3. This figure illustrates the pull exerted on one of the magnet cores during the time that the brake is being released. The pull on the core is represented on the ordinate and the stroke of the core on the abscissa. When the brake shoe is applied, the pull on the core is zero as the springs 26 and 31 exert equal and opposite effects, maintaining a state of equilibrium. When the electromagnet is energized to release the brake, the pull on the core causes the compression of spring 31 and the expansion of spring 26. Thus, the pull exerted on the core is equal to the difference between the force exerted by the springs. The pull on the core up to the time that the clearance is taken up may therefore be represented by the portion 53 of the curve of a certain slope, depending upon the relative strengths of the springs. When the brake arm is picked up, the pull exerted rises abruptly to an amount sufficient to lift the shoe from the drum, as represented by portion 54 of the curve. Thereafter, as spring 26 no longer exerts any force to apply the brake shoe, the pull becomes the force necessary to overcome the compression of spring 31, and may be represented by the portion 55 of the curve. Thus it is seen that as the electromagnet is energized to release the brake, the pull exerted on each core is not built up immediately to a point sufficient to release the shoe from the drum but is gradually built up to this point, thereby causing the pressure with which the shoe is applied to the drum to be gradually decreased and giving a delayed action. The delayed action provided when the brake is applied is obtained in a similar manner and it is believed that it will be understood from the above description without a graphic representation of the forces involved. When the magnet is deenergized, each of springs 31 expands to move its shoe quickly into engagement with the drum. At the instant this engagement occurs, the pressure with which the shoe is applied to the drum is zero. Thereafter, spring 31 acts to overcome the force of spring 26 to build up the pressure with which the shoe is applied to the drum, thereby causing brake application to be gradually made.

Brake mechanism embodying the principles of applicant's invention assures the release of the brake under conditions where voltage fluctuations occur as the brake releasing force is built up gradually from zero to an amount sufficient to release the brake instead of being brought up to this amount immediately. Also, a gradual application and release of the brake is obtained regardless of wear on the brake shoes, so long as sufficient lost motion is maintained to be taken up before the brake shoes are actually released.

The embodiments of the invention chosen for purposes of illustration have been schematically illustrated as they are intended merely to show the principles of operation. It is intended that all matter contained herein shall be interpreted as illustrative and not in a limiting sense.

What is claimed is:

1. In combination; a brake drum; a pair of oppositely disposed brake shoes for engaging said drum; an operating lever for each shoe; a compression spring for each lever for operating such lever to apply the shoe for which the lever is provided to said drum; a lost motion connection between each lever and said operating spring for that lever; an additional compression spring for each lever for biasing said lever in a direction to take up said lost motion; an electromagnet; and means operable by said electromagnet for operating said levers against the force of said operating springs to release said shoes from said drum, said operating springs, in applying said shoes to said drum, acting through said levers and biasing springs to move said shoes into engagement with said drum and thereafter acting through said lost motion connections to compress said biasing springs and thus gradually build up to full value the force with which said shoes are applied to said drum, said biasing springs expanding, upon energization of said electromagnet to effect the release of said shoes from said drum, to take up said lost motion and thus gradually decrease the pressure of said shoes on said drum, and said electromagnet acting through said levers when said lost motion is taken up to disengage said shoes from said drum.

2. In combination; a brake drum; a pair of brake shoes for engaging said drum; an operating lever for each shoe; a pair of compression springs, one for each lever; a pair of additional compression springs, one for each lever, intermediate the first named compression springs and said shoes, said first named springs acting to compress said additional springs to apply said shoes to said drum; electromagnetic means for releasing said shoes from said drum, said electromagnetic means upon actuation acting to compress the first named springs, said additional springs expanding as the first named springs are compressed; and means for limiting the amount of expansion of said additional springs.

FREDERICK HYMANS.